United States Patent
Ravan et al.

(10) Patent No.: US 11,053,688 B2
(45) Date of Patent: Jul. 6, 2021

(54) ADJUSTABLE GLASS GRIP

(71) Applicant: Euro Ornamental Forgings Inc., Woodbridge (CA)

(72) Inventors: Ali Ravan, Woodbridge (CA); Henry Mercieca, Woodbridge (CA)

(*) Notice: Subject to any disclaimer, the term of this patent is extended or adjusted under 35 U.S.C. 154(b) by 0 days.

(21) Appl. No.: 16/574,320

(22) Filed: Sep. 18, 2019

(65) Prior Publication Data

US 2020/0087919 A1   Mar. 19, 2020

Related U.S. Application Data

(60) Provisional application No. 62/733,392, filed on Sep. 19, 2018.

(51) Int. Cl.
*E04F 11/18* (2006.01)
*F16B 2/06* (2006.01)

(52) U.S. Cl.
CPC ...... *E04F 11/1812* (2013.01); *E04F 11/1853* (2013.01); *F16B 2/065* (2013.01); *E04F 2011/1895* (2013.01)

(58) Field of Classification Search
CPC .............. E04F 11/1812; E04F 11/1851; E04F 11/1853; E04F 2011/1895; F16B 2/065; F16B 2/14; Y10T 403/7067; Y10T 403/7069; Y10T 403/76
USPC ............. 256/24, 31; 403/374.3, 374.4, 409.1
See application file for complete search history.

(56) References Cited

U.S. PATENT DOCUMENTS

| | | | | |
|---|---|---|---|---|
| 6,517,056 B2* | 2/2003 | Shepherd | ............ | E04F 11/1851 256/24 |
| 7,559,536 B1* | 7/2009 | Hansen | ............... | E04F 11/1851 256/25 |
| 7,730,682 B2* | 6/2010 | Nash | ................... | E04F 11/1851 52/238.1 |
| 8,181,405 B2* | 5/2012 | Nash | ................... | E04F 11/1851 52/238.1 |
| 9,617,736 B2* | 4/2017 | Zhou | ................... | E04F 11/1812 |
| 9,657,760 B2* | 5/2017 | Giacometti | ......... | E04F 11/1812 |
| 2016/0298375 A1* | 10/2016 | Wagner | ............... | E04F 11/1812 |
| 2018/0135669 A1* | 5/2018 | Dagand | ............... | E04F 11/1853 |

* cited by examiner

*Primary Examiner* — Josh Skroupa
(74) *Attorney, Agent, or Firm* — Nasser Ashgriz; UIPatent Inc.

(57) ABSTRACT

An adjustable clamping system for mounting a glass balustrade. The adjustable clamping system comprises of a base shoe with a U-shaped channel, a first L-shaped plate, a second L-shaped plate and a third L-shaped plate which a tilting mechanism sits on the short-upright arm and the long-upright arm is engaged to the glass balustrade from an outside and to the tilting mechanism from an inside. The tilting mechanism comprises of a first-block and a second-cube, an L-shaped block at the bottom, and two wedge parts between the L-shaped block and the first-block and the second-cube, and wherein the first-cube, the second-block and the L-shaped block connected together by two socket screws, by turning the socket screws, two wedge parts at a top portion and a bottom portion of the tilting mechanism move to the right and left and push to the right-side wall of the base shoe to adjust the glass balustrade.

8 Claims, 11 Drawing Sheets

Prior Art  Prior Art

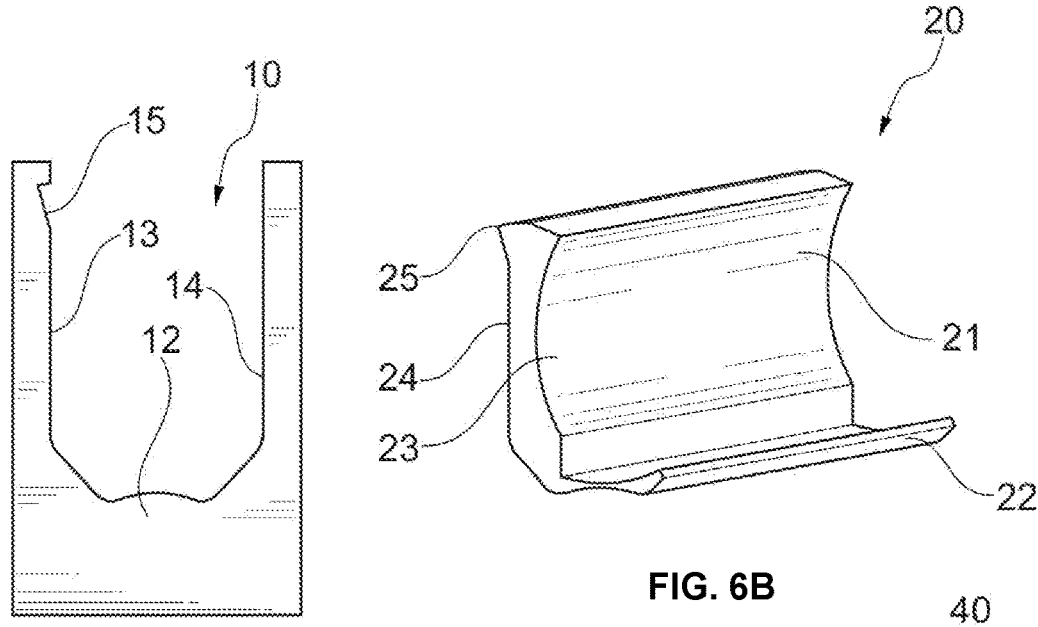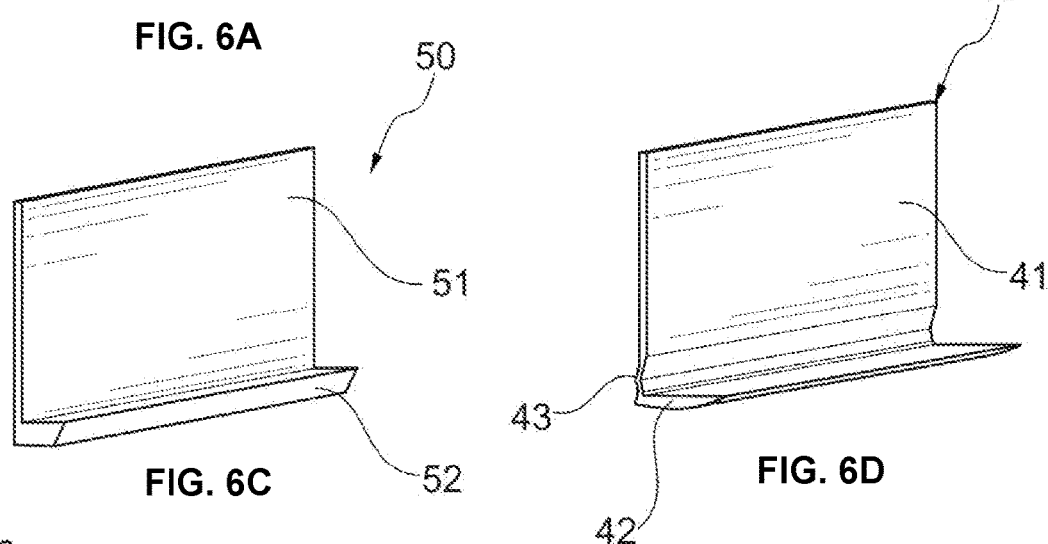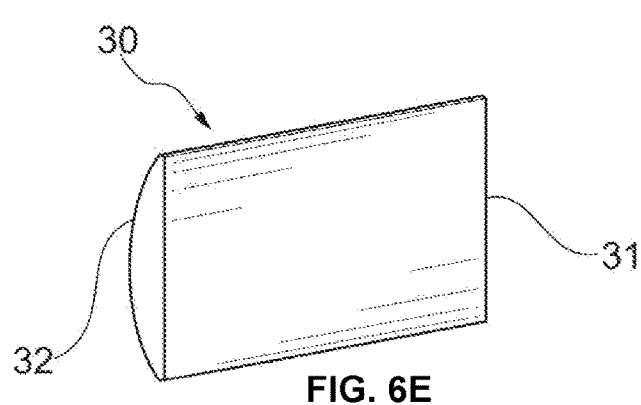
FIG. 6A
FIG. 6B
FIG. 6C
FIG. 6D
FIG. 6E

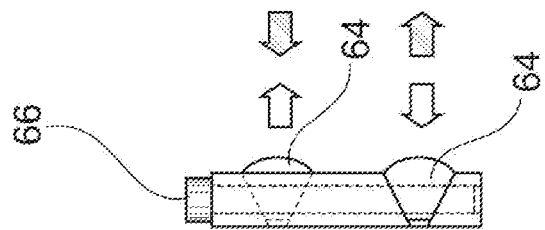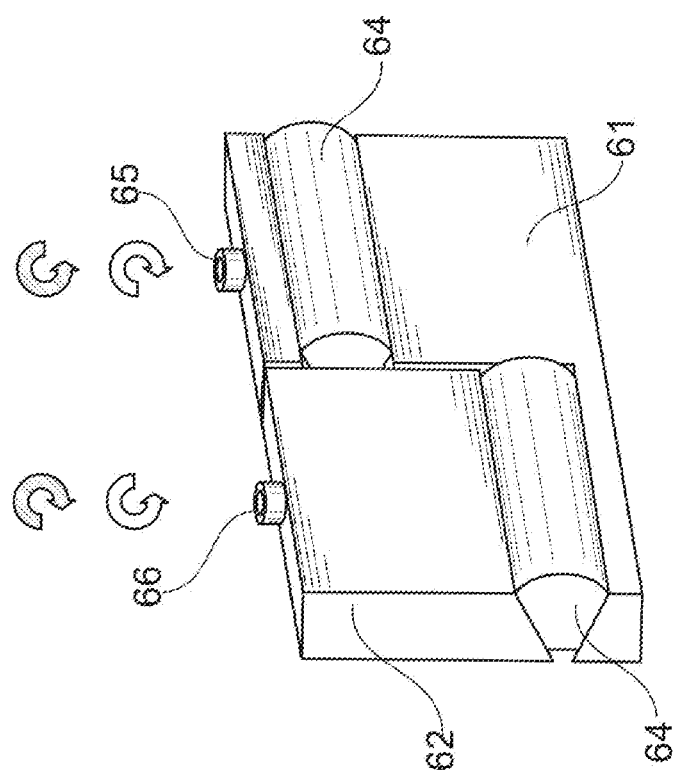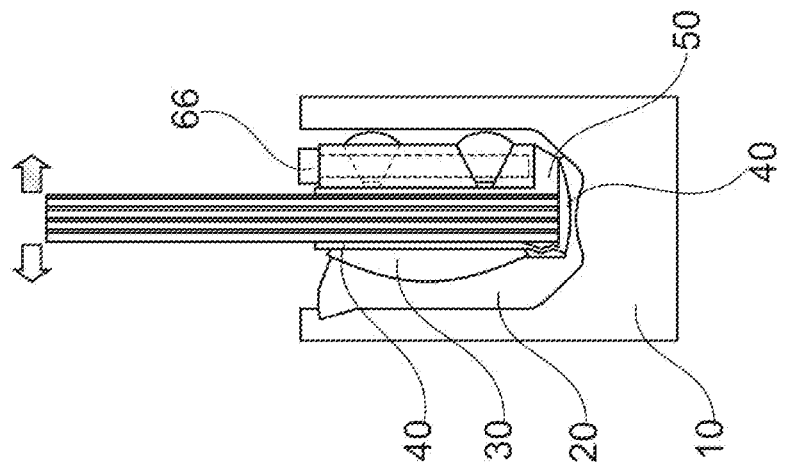
FIG. 10C
FIG. 10B
FIG. 10A

ADJUSTABLE GLASS GRIP

RELATED APPLICATION

The present invention claims the priority date of the provisional patent application No. 62/733,392 filed on Sep. 19, 2018.

FIELD OF THE INVENTION

The present invention pertains generally to a device to hold cantilever panels, and especially to support glass balustrades.

BACKGROUND OF THE INVENTION

Cantilever glass panels (typically used as guards or partitions) have two main components: a base shoe and a grip to hold the glass panel as shown in FIG. 1(a). The base shoe is basically a U-channel secured to a substrate, and the grips is a specific clamp that is secured within the base shoe to hold the panels in place. When the substrate on which the base shoe is being installed is not levelled properly, the panel will not be able to remain vertical (FIG. 1(b)).

The key feature of the present invention is to provide an angular backward and forward adjustability for the panel. Therefore, in the event of installing the base shoe on a slope, the grip compensates for the substrate angle and aligns the panel (FIG. 1(c)).

Prior arts provide mechanisms to tilt a glass. For example, the Tilt-Lock system has two small bolts/nuts located at different levels. Bolts are welded on a plate, forming a pressure plate on the right side of the glass (FIG. 2). A curved plate on the left side of the glass provides angular flexibility. By tightening or loosening the upper and the lower nuts, the vertical angle of the pressure plate changes; as a result, the glass can be tilted to the left or right.

In the Tilt-lock system, the contact area between the clamping mechanism should be increased for long-term applications. For the pressure plate, the contact area between the nuts on the tilting mechanism and the inside surface of the base shoe (U-channel) is a small area, especially when the glass tilts and the edge of the nut remains in contact with the base shoe. Since the base shoe is made of aluminum, eliminating the bearing stress on the U-channel exerted by the steel nuts is considered as an improvement.

The contact area between the curved plate and the base shoe is small, and due to the flexibility of the base shoe, the load capacity of the grip system for an inward load is less than that for an outward load condition.

While the glass is being installed, the glass grips secured within the base shoe do not remain open by themselves so, putting a piece of glass panel into the glass grips is not easy.

The other mechanism is the vertical wedge system, as FIGS. 3A and 3B. In this system, a clamping mechanism on the left side pushes the glass at two different levels. A curved surface on the right side provides flexibility for the system. The other mechanism is the PanelGrip system, which is not tilt adjustable, but it comes with a wedge for the clamp mechanism (FIG. 4).

In the vertical wedge system, the base shoe has an internal V-shape profile that causes an upward force reaction due to the clamping force. There is a flat surface on the wedges in direct contact with the base shoe. Therefore, when the glass tilts, wedges cannot adjust themselves with the surface of the base shoe. This system has one central fastener on the wedge side that reduces the reliability of the total system. In the PanelGrip, the system is not tilt adjustable, so it is not comparable with the systems mentioned above.

The present invention has the following advantages over the prior art:
  larger contact area between a pressure mechanism and the base shoe by forming a curved surface on the wedges;
  better engagement between the clamp and the base shoe by small V-slots on the mating surfaces of the base shoe and the clamp (flexible support);
  two fasteners (separate screw for each wedge) provide more reliability and less complexity, and
  glass grips are in two parts. One part is installed first, and the second part is installed after mounting the glass. Therefore, there is no need to keep the glass grip open.

SUMMARY OF THE INVENTION

The present invention is an adjustable clamping system for mounting a glass balustrade comprises of a base shoe with a U-shaped channel having a bottom wall, a left-side wall parallel to a right-side wall, and wherein the left-side wall has a notch on its top portion; a first L-shaped plate having a long arm having an inner and an outer surface, and a short arm, wherein the long arm has an arced groove at the inner surface and a substantially straight surface at the outer surface with an elongated nipple close to its top portion, and wherein the first L-shaped plate sits on the bottom wall and the left-side wall of the base shoe; a second L-shaped plate having a first arm and a second arm, wherein the first arm is connected to the second arm by a V-shaped portion, and wherein the V-shaped portion allows a spring action between the first arm and the second arm.

The adjustable clamping system of the present invention further comprises of a cushion part is placed between the first L-shaped plate and the second L-shaped plate, wherein the cushion part has a flat inner surface and a convex outer surface, the flat inner surface is engaged to the second L-shaped plate and the convex outer surface is engaged to the first L-shaped plate and a third L-shaped plate having two upright arms, wherein a tilting mechanism sits on the short-upright arm and the long-upright arm engages with the glass balustrade from an outside and to the tilting mechanism from an inside.

The adjustable clamping system of the present invention further comprises of the tilting mechanism comprises of a first-block at a right-side and a second-block at a left-side, an L-shaped block at the bottom, and two wedge parts between the L-shaped and the first-block and the second-block, wherein each first-block and the second-block has a trapezoidal area at their bottom portion, and wherein the L-shaped block also has two trapezoidal areas at its top portion, each wedge part also has two trapezoid areas which are engaged with the trapezoid area of the first-block and the second-block and the L-shaped cube, and wherein the first-cube, the second-block and the L-shaped block connected together by a first and a second screws, by turning the screws, two wedge parts at a top portion and a bottom portion of the clamping mechanism move to the right and push to the right-side wall of the base shoe to adjust the glass balustrade, whereby a tilt angle of the glass balustrade is controlled by independently adjusting the first and the second screws.

The present Invention is an adjustable clamping system for glass panels installed into a base shoe. The present invention provides adjustability, rigidity, and reliability for a grip to secure a glass. A clamp mechanism is provided that has two wedges, equipped with individual screws, and have a long linear contact area with a base shoe, which makes the clamp mechanism adjustable and reliable. The present invention comprises of two-piece curved plates with parallel surfaces having a wide internal contact area. A concave plate is engaged with the base shoe by a groove at the top.

The present Invention is more stable in terms of making panels more rigid by:
- wider contact area with the base shoe on the clamp side;
- larger surface area for the curved plate, and
- grip mechanism to hold the stationary curved plate in place.

BRIEF DESCRIPTION OF THE DRAWINGS

Embodiments herein will hereinafter be described in conjunction with the appended drawings provided to illustrate and not to limit the scope of the claims, wherein like designations denote like elements, and in which.

FIG. 6A shows a components of the adjustable glass grip of the present invention;

FIG. 6B shows a component of the adjustable glass grip of the present invention;

FIG. 6C shows a component of the adjustable glass grip of the present invention;

FIG. 6D shows a component of the adjustable glass grip of the present invention;

FIG. 6E shows a component of the adjustable glass grip of the present invention;

FIG. 10A shows the tilt adjustability for the clamping mechanism of the present invention;

FIG. 10B shows the tilt adjustability for the clamping mechanism of the present invention, and FIG. 10C shows the tilt adjustability for the clamping mechanism of the present invention.

DETAILED DESCRIPTION OF PREFERRED EMBODIMENTS

Figure 1:
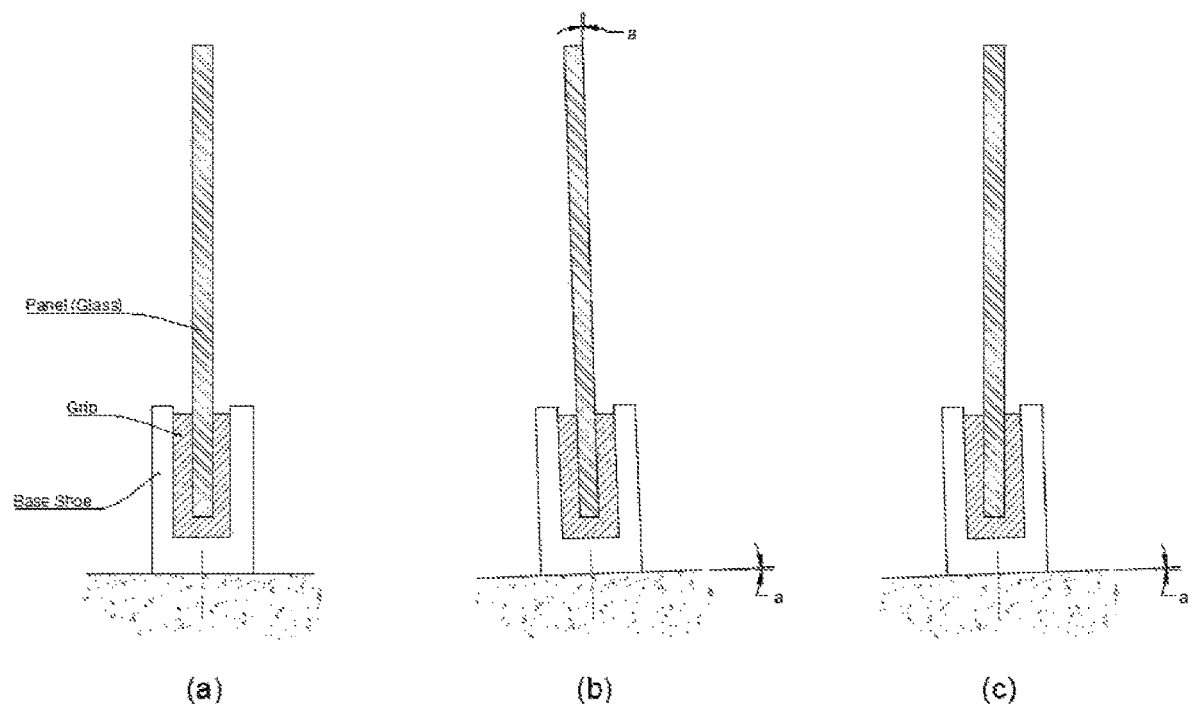
FIG. 1 shows a base shoe and a grip to hold a glass panel in the prior art.
Figure 2:
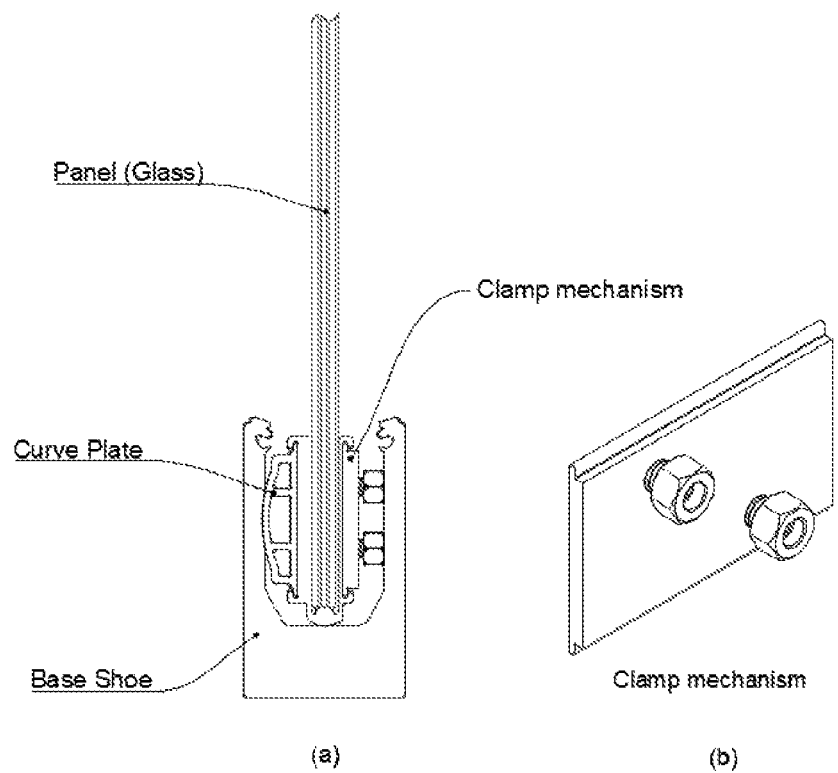
FIG. 2 shows a set of bolts welded on a plate to form a pressure plate in the prior art.
Figure 3A:
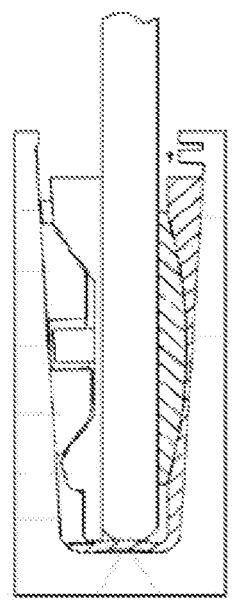
FIG. 3A shows a vertical wedge system in the prior art.
Figure 3B:
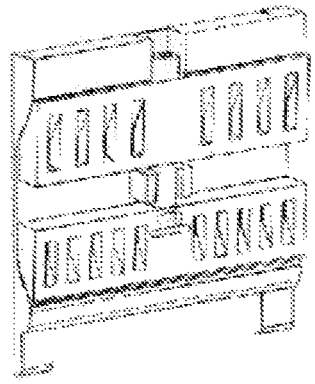
FIG. 3B shows a vertical wedge system in the prior art.
Figure 4:
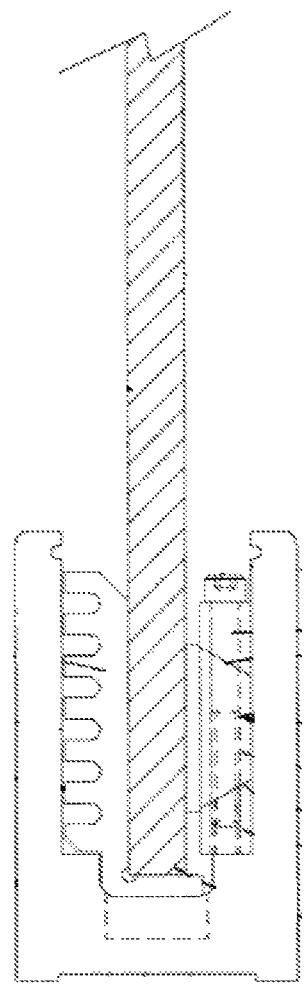
FIG. 4 shows a panel grip system in the prior art.
Figure 5:
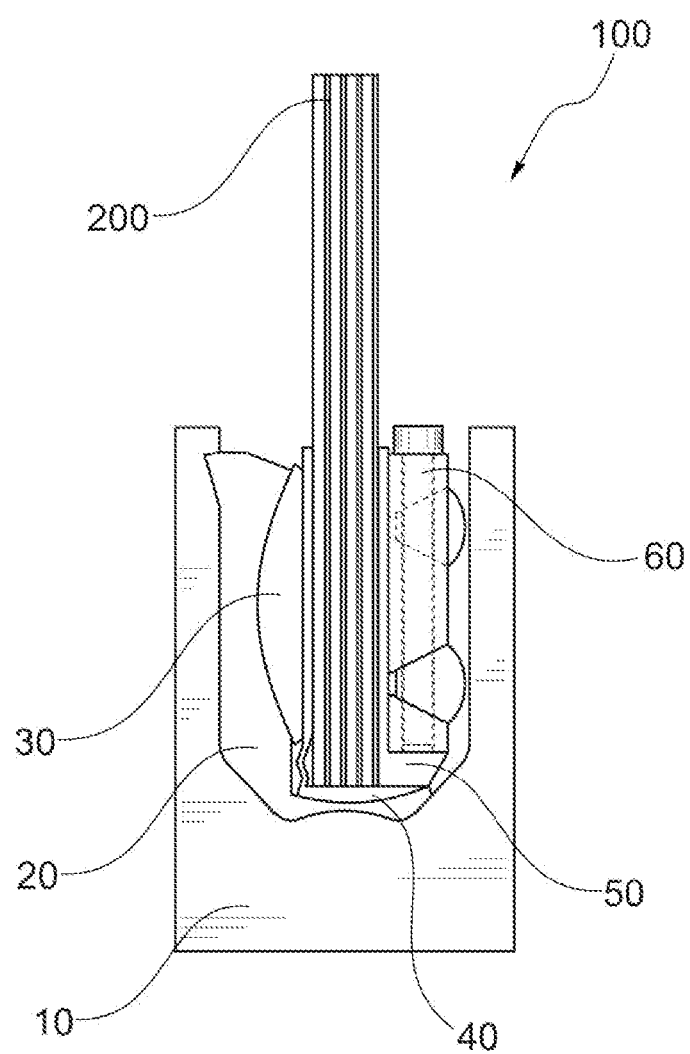
FIG. 5 shows an adjustable glass grip of the present invention.

The figures are not intended to be exhaustive or to limit the present invention to the precise form disclosed. It should be understood that the invention can be practiced with modification and alteration, and that the disclosed technology be limited only by the claims and equivalents thereof.

The invention disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

An adjustable clamping system 100 for mounting a glass balustrade 200 is shown in FIGS. 5 and 6A, 6B, 6C, 6D and 6E. An adjustable clamping system 100 of the present invention comprises of a base shoe 10 with a U-shaped channel 11 having a bottom wall 12 and a left-side wall 13 and a right-side wall 14, the left-side wall 13 and the right-side wall 14 of the base shoe 10 are parallel. Furthermore, the left-side wall 13 has a notch 15 at the top portion.

For mounting a glass balustrade 200 inside the base shoe 10, a first L-shaped plate 20, a second L-shaped plate 40 and a third L-shaped plate 50 are inserted into the base shoe 10 to hold the glass balustrade 200. The first L-shaped plate 20 has a long arm 21 and a short arm 22 which the long arm 21 is arced 23 on its inner surface and a straight surface at an outer surface 24 with an elongated nipple 25 at a top portion. The configuration of the outer surface 24 of the first L-shaped plate 20 and the left-side wall 13 is in a way that the first L-shaped plate 20 sits on the bottom wall 12 and the left-side wall 13.

The second L-shaped plate 40 has a first arm 41 and a second arm 42 which the first arm 41 connected to the second arm 42 by a V-shaped portion 43. The V-shaped portion 43 provides a spring mechanism for the first arm 41 and the second arm 42.

Again, as shown in FIGS. 5 and 6A, 6B, 6C, 6D and 6E, between the first L-shaped plate 20 and the second L-shaped plate 40, a cushion part 30 is placed. The cushions part 30 has a flat inner surface 31 and a convex outer surface 32. The flat inner surface 31 is engaged to the second L-shaped plate 40 and the convex outer surface 32 is engaged to the first L-shaped plate 20.

Again, as shown in FIGS. 5 and 6A, 6B, 6C, 6D and 6E, the third L-shaped plate 50 has two upright arms 51-52. The tilting mechanism 60 sits on the short arm 52 and the long arm 51 is engaged to the glass balustrade 200 from outside and to the tilting mechanism 60 from inside.

Figure 7A:
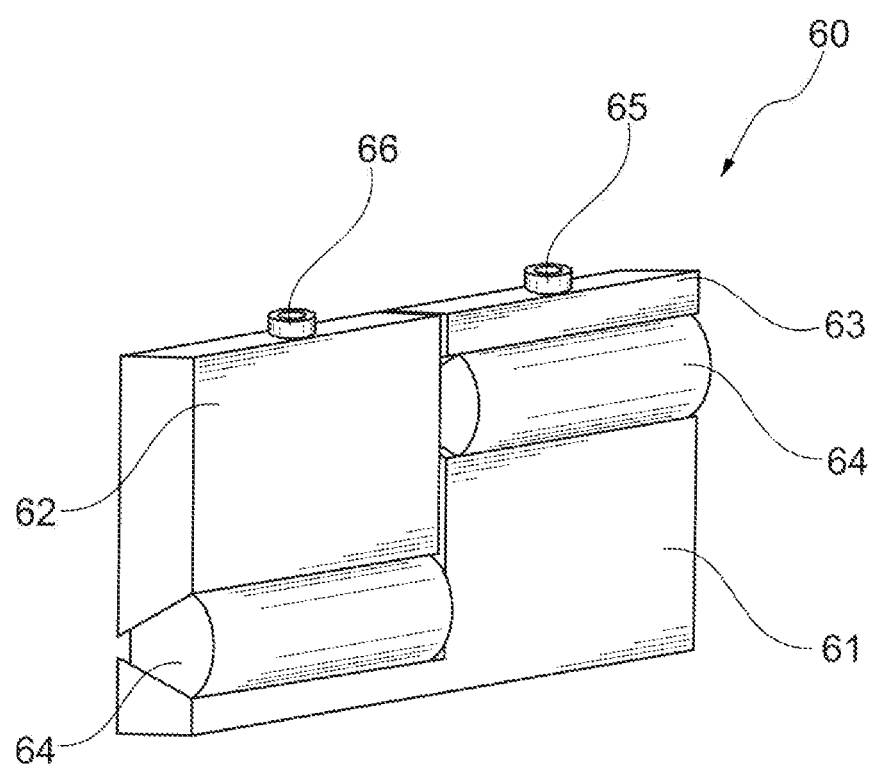
FIG. 7A shows the clamping mechanism of the present invention.
Figure 7B:
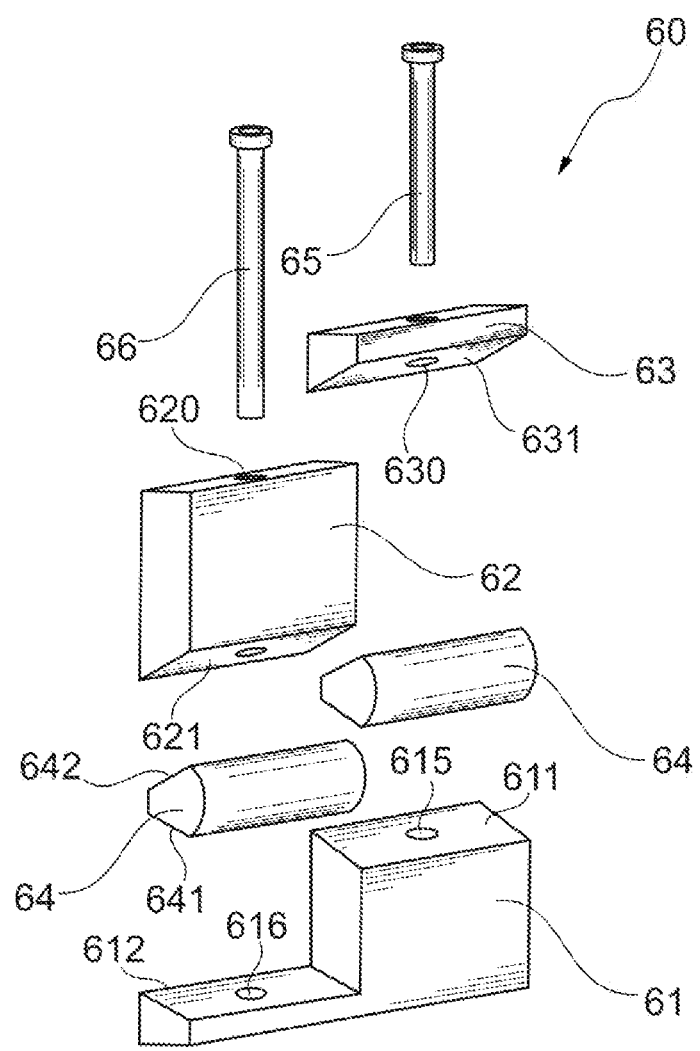
FIG. 7B shows the clamping mechanism of the present invention.
Figure 8A:
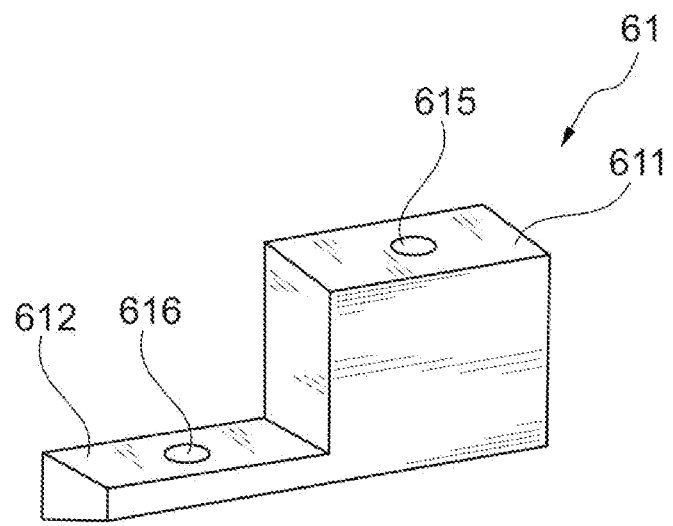
FIG. 8A shows different views of the clamping mechanism of the present invention.
Figure 8B:
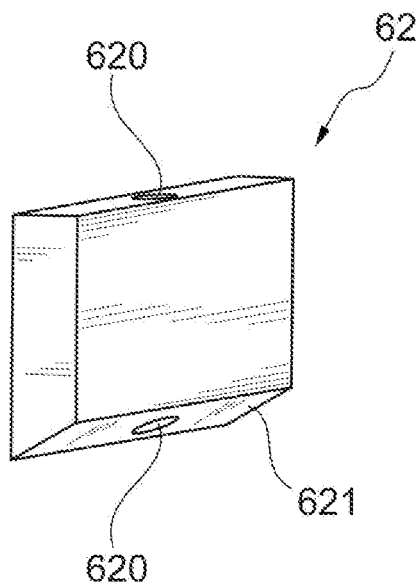
FIG. 8B shows different views of the clamping mechanism of the present invention.
Figure 8C:
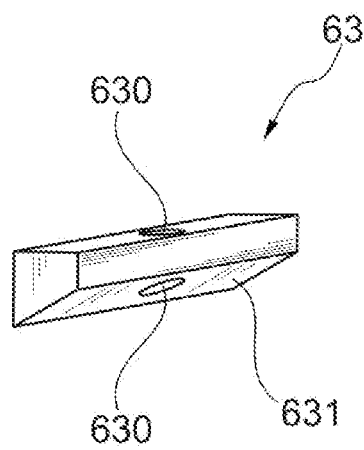
FIG. 8C shows different views of the clamping mechanism of the present invention.
Figure 9A:
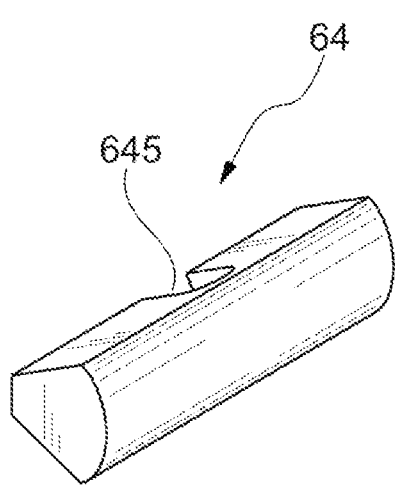
FIG. 9A shows a wedge part of the clamping mechanism of the present invention.
Figure 9B:
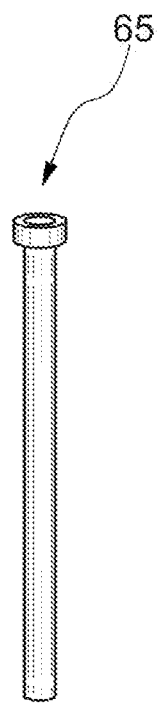
FIG. 9B shows a socket screw of the clamping mechanism of the present invention.
Figure 9C:
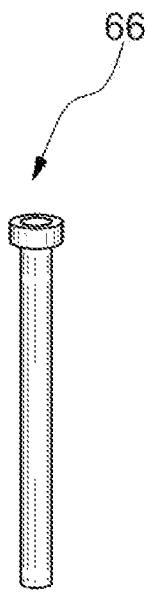
FIG. 9C shows a socket screw of the clamping mechanism of the present invention.

FIGS. 7A and 7B shows the tilting mechanism 60 of the present invention. The tilting mechanism 60 comprises of five elements 61-64 which are connected together by two socket screws 65-66. By turning the socket screws 65-66, two wedge parts 64 at a top portion and a bottom portion of the tilting mechanism move to the right and against the right-side wall 14 of the base shoe 10. The movement of two wedge parts 64 can adjust the glass balustrade 200.

Again, as shown in FIGS. 7A and 7B, the shape of the tilting mechanism 60 of the present invention is a block with two wedge parts with two curvature surfaces in one side. The length of the two wedge parts can be adjusted by two socket screws 65-66.

The tilting mechanism 60 of the present invention comprises of a first-block 63 at a right-side and a second-block 62 at a left-side, an L-shaped block 61 at the bottom, and two wedge parts 64 between the L-shaped block 61 and the first-block 63 and the second-block 62. Each first block 63 and the second-block 62 has a trapezoid area 631 and 621 at their bottom portion. The L-shaped block 61 also has two trapezoid areas 611 and 612 at the top portion. Each wedge part 64 also has two trapezoid areas 641-642 which are engaged with the trapezoid area of the first-block 63 and the second-block 62 and the L-shaped block 61.

FIGS. 7A, 7B, 8A, 8B and 8C and 9A, 9B and 9C show components of the tilting mechanism 60. The tilting mechanism 60 comprises of a L-shaped block 61 with two vertical tapped holes 615-616. Upper edges of the tilting mechanism 60 has an angle. The second-block 62 and the first-block 63 each has a central vertical hole 620 and 630 and come with an angle at the bottom surface. The second-block 62 is longer than the first-block 63. The wedge part has a curvature surface and a vertical slot 645 on the back. The socket screws 65-66 passing through wedge part 64 to connect to the L-shaped block 61.

FIG. 10 shows how the tilting mechanism 60 tilts the glass balustrade 200. By tightening and loosening the socket screws 65-66 individually, the first-block 63 and the second-block 62 move up and down separately. When the second-block 62 and the first-block 63 moving, they push wedge parts 64 out or provide room for wedge parts 64 to come in. Because the two wedge parts 64 are at different levels, by adjusting the socket screws 65-66, the tilting mechanism 60 is able to push the glass balustrade 200 from the top or the bottom of the clamp. Considering the curvature mechanism on the other side of the glass, by adjusting the socket screws 65-66, the glass grip is able to adjust the angle of the glass balustrade 200.

The tilting mechanism 60 might have more components such as a spring and a holding mechanism for the wedge part 64. Two compression springs can be added to keep the first-block 63 and the second-block 62 open. To hold the wedge part 64 in place, there might be two rubber bands for each the wedge part 64 to push them into the groove.

The base shoe 10 in the present invention can be made preferably as an aluminium profile extended all the way through in line with the glass balustrade 200 which might be in different lengths installed side by side into the base shoe 10.

The glass grip of the present invention comprises of five major parts to hold the glass balustrade 200 into the base shoe 10 thus providing tilt adjustability for the glass balustrade 200. The side walls 13-14 of the base shoe 10 are parallel. The first L-shaped plate 20 made from an aluminium material that sits into the base shoe 10 and provides a concave surface where the cushion part 30 is located. The cushion part 30 is made of aluminium.

The second L-shaped plate 40 is a hard-plastic gasket to protect left side and bottom of the glass balustrade 200 from contact with metallic surfaces of the first L-shaped plate 20 and the cushion part 30. The third L-shaped plate 50 is a hard-plastic gasket to protect the right side of the glass balustrade 200 where the tilting mechanism 60 is located.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An adjustable clamping system for mounting a glass balustrade comprises of a) a base shoe with a U-shaped channel having a bottom wall, a left-side wall parallel to a right-side wall, and wherein the left-side wall has a notch at its top portion;
   b) a first L-shaped plate having a long arm having an inner and an outer surface, and a short arm, wherein the long arm has an arced groove at the inner surface and a substantially straight surface at the outer surface with an elongated nipple at its top portion, and wherein the first L-shaped plate sits on the bottom wall and the left-side wall of the base shoe;
   c) a second L-shaped plate having a first arm and a second arm, wherein the first arm is connected to the second arm by a V-shaped portion, and wherein the V-shaped portion allows a spring action between the first arm and the second arm;
   d) a cushion part is placed between the first L-shaped plate and the second L-shaped plate, wherein the cushion part has a flat inner surface and a convex outer surface, the flat inner surface is engaged to the second L-shaped plate and the convex outer surface is engaged to the first L-shaped plate;
   e) a third L-shaped plate having two upright arms, wherein a tilting mechanism sits on the short-upright arm and the long-upright arm configured to engage with a glass panel from an outside and to the tilting mechanism from an inside;
   f) the tilting mechanism comprises of a first-block at a right-side and a second-block at a left-side, an L-shaped block at the bottom, and two wedge parts between the L-shaped and the first-block and the second-block, wherein each first-block and the second-block has a trapezoidal area at their bottom portion, and wherein the L-shaped block also has two trapezoidal areas at its top portion, each wedge part also has two trapezoid areas which are engaged with the trapezoid area of the first-block and the second-block and an L-shaped cube, and wherein a first cube, the second-block and the L-shaped block connected together by a first and a second screws, by turning the screws, two wedge parts at a top portion and a bottom portion of the tilting mechanism move to the right and push to the right-side wall of the base shoe to adjust the glass, whereby a tilt angle of the glass panel is controlled by independently adjusting the first and the second screws.

2. The adjustable clamping system for mounting a glass balustrade of claim 1, wherein the base shoe is preferably made of an aluminium profile configured to extend all the way through in line with the glass panel.

3. The adjustable clamping system for mounting a glass balustrade of claim 1, wherein the first L-shaped plate and the semi-cushions part are made from an aluminium material.

4. The adjustable clamping system for mounting a glass balustrade of claim 1, wherein the second L-shaped plate is made of a plastic gasket to protect a left side and a bottom side of the glass balustrade from contact with metallic surfaces of the first L-shaped plate and the semi-cushions part.

5. The adjustable clamping system for mounting a glass balustrade of claim 1, wherein the third L-shaped plate is made of a plastic gasket configured to protect a right side of the glass panel wherein the tilting mechanism is located.

6. An adjustable clamping system for mounting a glass balustrade comprises of:

a) a base shoe with a U-shaped channel having a bottom wall, a left-side wall in parallel orientation to a right-side wall;

a) a first L-shaped plate having a long arm with an inner and an outer surface, and a short arm, wherein the long arm has an arced shape section at the inner surface and has a substantially straight shape at the outer surface with an elongated nipple at its top portion, and wherein the first L-shaped plate sits on the bottom wall and the left-side wall of the base shoe;

b) a second L-shaped plate having a first arm and a second arm, wherein the first arm is connected to the second arm by a V-shaped portion, and wherein the V-shaped portion provides a spring action and tiltability between the first arm and the second arm, and c) a cushion part placed between the first L-shaped plate and the second L-shaped plate, wherein the cushion part has a flat inner surface and a convex outer surface, the flat inner surface engages with the second L-shaped plate and the convex outer surface engages with the arced shape section of the first L-shaped plate, and d) a tiltable multicomponent holder inserted in the U-shaped channel between a glass panel and the right-side wall, and comprising of at least two wedges, wherein each wedge is sandwiched between a pair of blocks that are connected to each other with a screw and are configured to push each wedge against a glass panel and to control a tilt angle of the glass panel by independently turning each screw.

7. The adjustable clamping system for mounting a glass balustrade of claim 6, wherein the first L-shaped plate and the cushion part are made from an aluminium material.

8. The adjustable clamping system for mounting a glass balustrade of claim 6, wherein the second L-shaped plate is made of a plastic gasket configured to protect a left side and a bottom side of the glass panel from contact with metallic surfaces of the first L-shaped plate and the cushion part.

* * * * *